US008586895B2

(12) United States Patent
Haeberer et al.

(10) Patent No.: US 8,586,895 B2
(45) Date of Patent: Nov. 19, 2013

(54) VEHICLE TANK FOR A LIQUID REDUCING AGENT, IN PARTICULAR FOR A UREA SOLUTION

(75) Inventors: Rainer Haeberer, Bretten (DE); Matthias Horn, Freiberg (DE); Christoph Wallis, Kitzbühel (AU)

(73) Assignee: Robert Bosch GmbH, Stuttgart (DE)

( * ) Notice: Subject to any disclaimer, the term of this patent is extended or adjusted under 35 U.S.C. 154(b) by 1538 days.

(21) Appl. No.: 12/066,586

(22) PCT Filed: Sep. 8, 2006

(86) PCT No.: PCT/EP2006/066155
§ 371 (c)(1),
(2), (4) Date: Jul. 3, 2008

(87) PCT Pub. No.: WO2007/031467
PCT Pub. Date: Mar. 22, 2007

(65) Prior Publication Data
US 2009/0065508 A1    Mar. 12, 2009

(30) Foreign Application Priority Data

Sep. 12, 2005  (DE) .................... 10 2005 043 565
Jun. 14, 2006  (DE) .................... 10 2006 027 487

(51) Int. Cl.
*B65D 88/12* (2006.01)

(52) U.S. Cl.
USPC ........... 219/209; 219/202; 219/205; 219/206; 220/562

(58) Field of Classification Search
USPC .......... 219/209, 202, 205, 206; 220/564, 562; 60/286, 303, 295, 272, 282, 301, 302
See application file for complete search history.

(56) References Cited

U.S. PATENT DOCUMENTS

| 4,090,668 | A | * | 5/1978 | Kochenour | 239/130 |
| 5,443,874 | A | * | 8/1995 | Tachi et al. | 428/36.7 |
| 5,976,475 | A | | 11/1999 | Peter-Hoblyn et al. | |
| 6,063,350 | A | | 5/2000 | Tarabulski et al. | |
| 6,338,420 | B1 | | 1/2002 | Pachciarz et al. | |
| 6,374,868 | B1 | * | 4/2002 | Channing | 141/9 |
| 6,957,013 | B2 | * | 10/2005 | Zimmer | 392/397 |
| 2003/0124282 | A1 | | 7/2003 | Detounay | |
| 2005/0241480 | A1 | * | 11/2005 | Lebowitz et al. | 95/146 |

FOREIGN PATENT DOCUMENTS

| DE | 42 01 708 A1 | 7/1993 |
| DE | 103 03 596 A1 | 8/2004 |
| WO | WO 98/43732 A1 | 10/1998 |
| WO | WO 01/39949 A2 | 6/2001 |
| WO | WO 03/016687 A1 | 2/2003 |
| WO | WO 2005/045209 A1 | 5/2005 |

* cited by examiner

*Primary Examiner* — Henry Yuen
*Assistant Examiner* — James Sims, III
(74) *Attorney, Agent, or Firm* — Michael Best & Friedrich LLP

(57) ABSTRACT

The invention relates to a plastic vehicle tank for an aqueous urea solution used for reducing the hydrogen oxide content in exhaust gases of an internal combustion engine. In the preferred embodiment, the inventive tank comprises a functional unit comprising at least one pump, at least one pressure control valve, at least one internal container provided with an internal electrical heating and at least one suction line. The functional unit is preferably mounted in the form of a lid on the container opening for closing it.

25 Claims, 9 Drawing Sheets

VEHICLE TANK FOR A LIQUID REDUCING AGENT, IN PARTICULAR FOR A UREA SOLUTION

CROSS-REFERENCE TO RELATED APPLICATION

This application is a 35 USC 371 application of PCT/EP 2006/066155 filed Sep. 8, 2006.

BACKGROUND OF THE INVENTION

1. Field of the Invention

The invention relates to a plastic vehicle tank for an aqueous urea solution used for reducing the hydrogen oxide content in exhaust gases of an internal combustion engine.

2. Description of the Prior Art

In vehicles operated with diesel fuel, among other needs, the pollutant NOx will have to be reduced considerably, given the impending more-stringent laws on engine exhaust in the next few years. One method that is employed is known as SCR (selective catalytic reduction), in which the pollutant NOx (nitrogen oxides) is reduced to $N_2$ and $H_2O$, with the aid of aqueous urea solution. To that end, the aqueous urea solution is injected upstream of the SCR catalytic converter into the exhaust tube via a metering valve. The aqueous urea solution evaporates in the hot exhaust gas and forms ammonia, which accumulates in the SCR catalytic converter. The ammonia accumulated in the catalytic converter converts the nitrogen oxides contained in the exhaust gas into elemental nitrogen and water vapor. The aqueous urea solution is stored in a tank. This reducing agent makes special demands of the tank. In utility vehicles, the SCR method is already in mass production. It employs tanks of special steel or aluminum, which are heated via the engine coolant.

SUMMARY AND ADVANTAGES OF THE INVENTION

Making a tank of aluminum or special steel is expensive and furthermore puts limitations on its shaping. For this reason, a plastic tank with various structural details is proposed. This plastic tank can be produced especially economically by blow molding.

Further advantages will become apparent from the characteristics described in the specification.

DESCRIPTION OF THE PREFERRED EMBODIMENTS

Figure 1A:
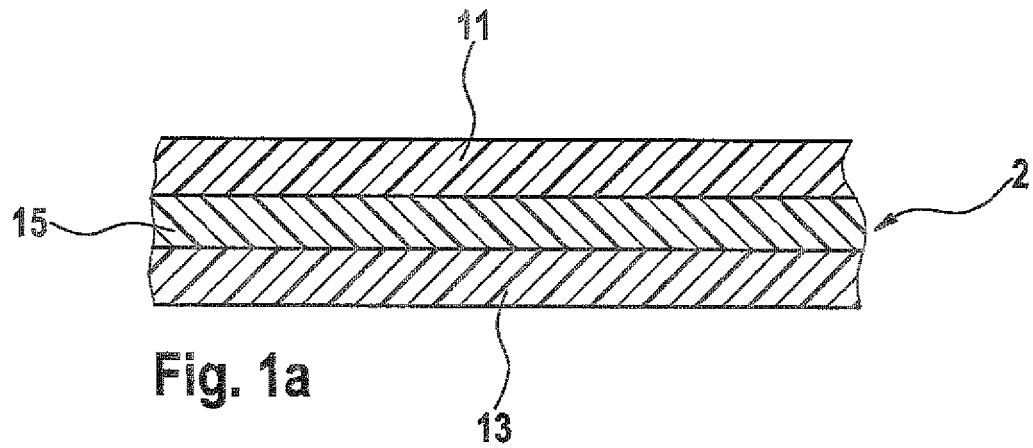
FIG. 1a shows a tank wall 2 of a reducing agent tank according to the invention.
Figure 1B:
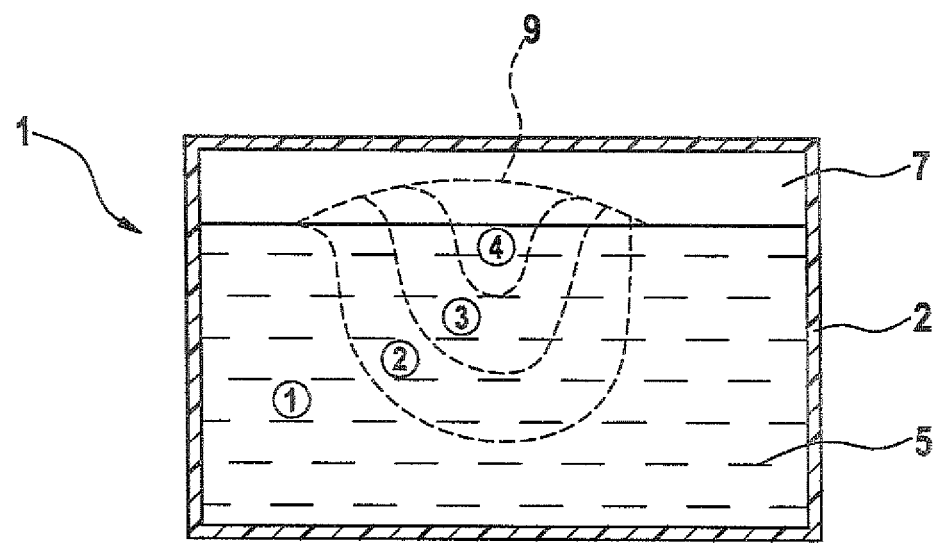
FIG. 1b shows a reducing agent tank with its contents.

FIG. 1 in a schematic view (without showing a tank opening for filling the tank and without showing a connection to an exhaust gas posttreatment arrangement), in part b, shows a tank 1 with a tank wall 2. The tank is made from plastic, such as PE (polyethylene), PA (polyamide), or PAA (polyarylamide). With "aqueous urea solution" as the reducing agent, the diffusion of ammonia through the tank wall to the outside must be avoided. This can be assured either by means of a suitably great wall thickness or a so-called Coex material. In the Coex material, the tank wall comprises a plurality of different layers of material, and one layer can for instance act as a barrier layer. Coex materials are typically made by means of coextrusion of a multilayer composite material. FIG. 1a shows the construction of the tank wall 2 in the form of a Coex layer comprising three partial layers, which are an inner layer 11 oriented toward the tank contents, an outer layer 13, and a barrier layer 15 located between the inner and outer layers. The aqueous urea solution 5 freezes below −11° C. Above the surface of the liquid, there is an air cushion. If a temperature lower than −11° C. surrounds this tank, then the tank first freezes in the region near the bottom and the walls. Since the air cushion 7 above the liquid acts as insulation, the liquid at the surface does not freeze until the end. The air cushion above the liquid thus acts as a compensation volume for the freezing aqueous urea solution. The intentional freezing at the bottom and the wall makes it impossible for the tank to burst, since the increase in volume is intentionally carried into the air-filled region of the tank. In FIG. 1b, the circled numerals 1 through 4 mark the order of the regions in which the tank contents freeze if the temperature goes below −11° C. The result is a hump 9 in the middle of the tank in the region of the air cushion 7.

Figure 2:
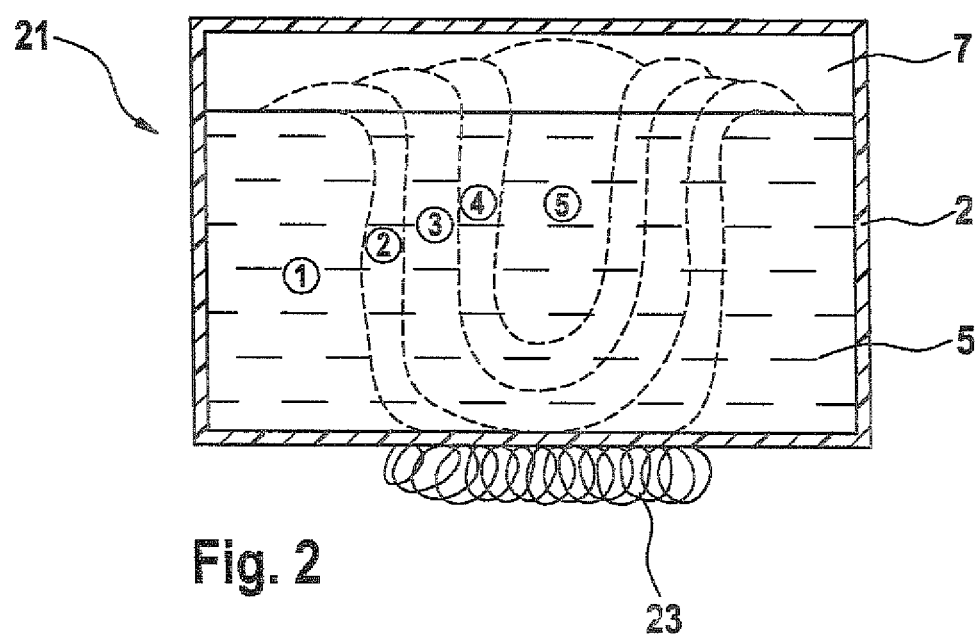
FIG. 2 shows a reducing agent tank with an insulation layer.

FIG. 2 shows a tank 21 with a tank wall 2 of plastic and with an additional insulation 23, for instance in the form of a thermal insulation layer, mounted on the tank bottom, in the middle. At the phase transition at −11° C., the aqueous urea solution experiences an expansion of approximately 7%. As a result of this increase in volume, damage to the tank can occur. A locally controlled freezing of the tank contents is an additional aid or precaution in this respect; it is assumed that the tank is not completely full; that is, there is an air cushion above the surface of the liquid. By purposefully mounting the insulation material at certain points of the tank, such as an insulation 23 here, the freezing process in the tank can be steered in a locally purposeful way. This insulation can be selected such that the growth of the ice can be shifted to certain regions that are not critical to the tank, for instance to the surface, where an air cushion can be created. The insulation 23 on the bottom changes the three-dimensional freezing process in such a way that in the middle of the tank (see the circled numeral 5), a region with still unfrozen liquid can be maintained for a long time; on the one hand, this means that the mechanical forces of the ice on the tank are less, and on the other, that for a relatively long time, even at low temperatures, one region of the tank is still available that holds a liquid that can be removed by suction and used to operate an exhaust gas posttreatment arrangement. The circled numerals 1 through 5, analogous to the view in FIG. 1, show the order of the regions in which the tank contents freeze when the temperature goes below −11° C.

Figure 3:
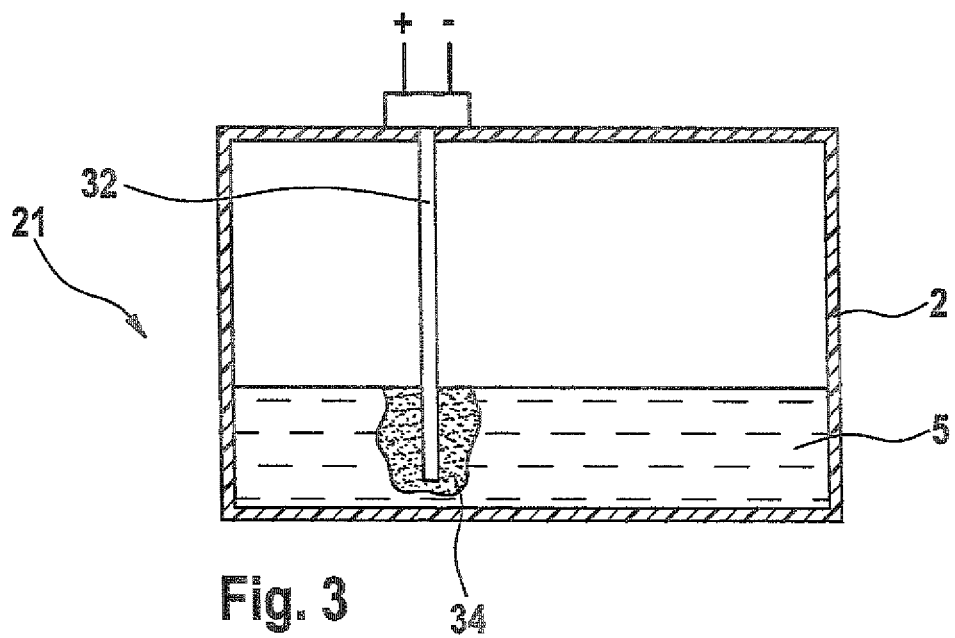
FIG. 3 shows a reducing agent tank with a heating bar.

If thawing occurs, which is done for instance via an electric heater or engine coolant circulating in lines that are in thermal contact with the tank, the heat for thawing can be concentrated on an intentional partial volume, by suitable disposition of the heating means. In FIG. 3, a tank with an electrical thawing mechanism, which is an electric heating bar 32 along with its electrical connections, is shown. Since there is only limited electrical power available, only a limited volume of ice 34, which moreover depends on the fill level in the tank, can be thawed, yet this thawing can be accomplished in only a short time, so that a downstream exhaust gas posttreatment arrangement or the tank arrangement is already operationally ready extremely quickly. If the tank is nearly empty or the fill level is low, then the volume available for the thawing becomes quite small; in other words, after only a short travel distance, there is no longer any thawed reducing agent available, especially since the liquid around the heating bar is removed by suction, and thus the heat can no longer be dissipated to the frozen reducing agent by way of the air.

Figure 4:
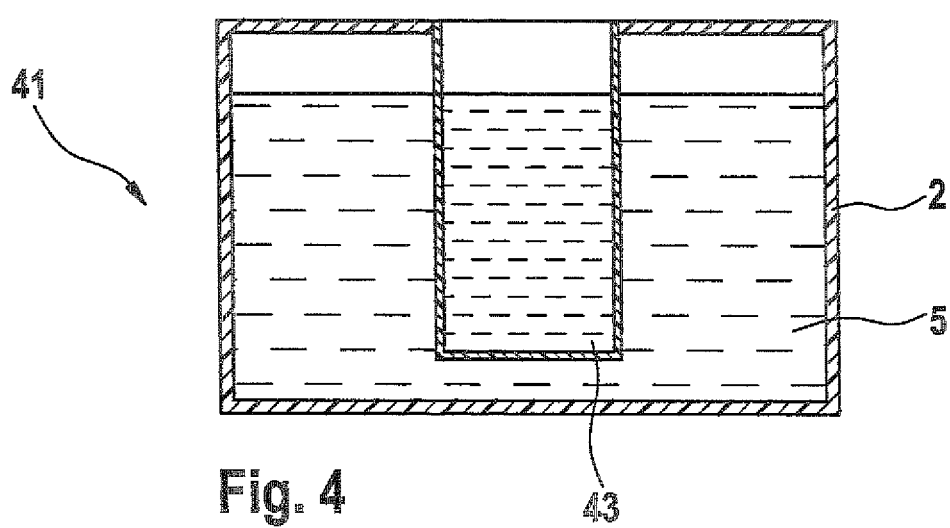
FIG. 4 shows a reducing agent tank with a built-in cup.

It is advantageous if a partial volume to be thawed is thermally insulated from the rest of the tank volume. Otherwise, the heat input distributes itself over the frozen total volume, and the thawing times increase. With the concentration on a small partial volume, the system is already operationally ready extremely quickly. Accordingly, FIG. 4 shows a tank 41 with a plastic wall 2; in its interior, this tank has a cup 43 which demarcates a partial volume from the rest of the tank. A heating element not identified by reference numeral here, analogous to the heating element that is shown in FIG. 3, can be disposed in this partial volume or on the cup wall, in particular on the inside of the cup wall, in order to heat or thaw the partial volume in a purposeful way. The cup is preferably positioned in the middle of the tank. This is advantageous since the liquid freezes first in the region near the wall and only after that does it freeze in the middle. Since it takes a relatively long time until even the middle of the tank is also frozen, when a cup is positioned in the middle of the tank the heater needs to be switched on only rarely, even though the outdoor temperature is below −11° C. This kind of cup may also have an overflow, as described below for instance in FIG. 5.

Figure 5:
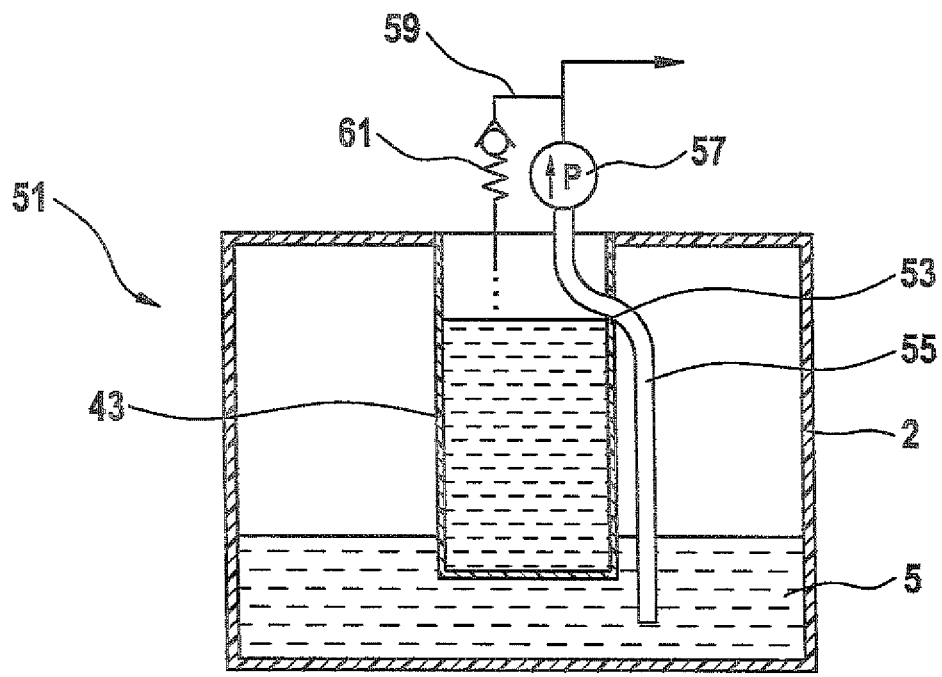
FIG. 5 shows a reducing agent tank with one line.

FIG. 5 shows a tank arrangement or tank 51, whose cup 43 disposed in it (in the middle of the tank) has an overflow 53. The cup 43, in the embodiment of FIG. 5, is intended to be completely fill at all times. This permanently full state of the cup is assured by providing that by a pump 57, accommodated in a pumping module, the liquid from outside the cup, that is, from the "remaining" tank, is pumped via a line 55 to the downstream exhaust gas posttreatment arrangement, not shown. The mechanical pressure regulation of the system is effected via a mechanical pressure regulating valve 61. This valve is accommodated in the pumping module, and the overflow quantity of this pressure regulator flows into the cup 43 via the return line 59. As a result, the cup is always maximally filled, only an excess quantity leaves the cup 43 via the overflow 53 in the direction of the outer region of the tank. At low temperatures, the ice in the cup is now first thawed out, preferably completely, by means of an electrical heating element, not shown in detail, disposed in the region of the cup. Initially, the ice in the remainder of the tank is not thawed out. This cup 43 is likewise of plastic and thus forms an insulation layer between the cup that is to be thawed out and the frozen total volume.

Figure 6:
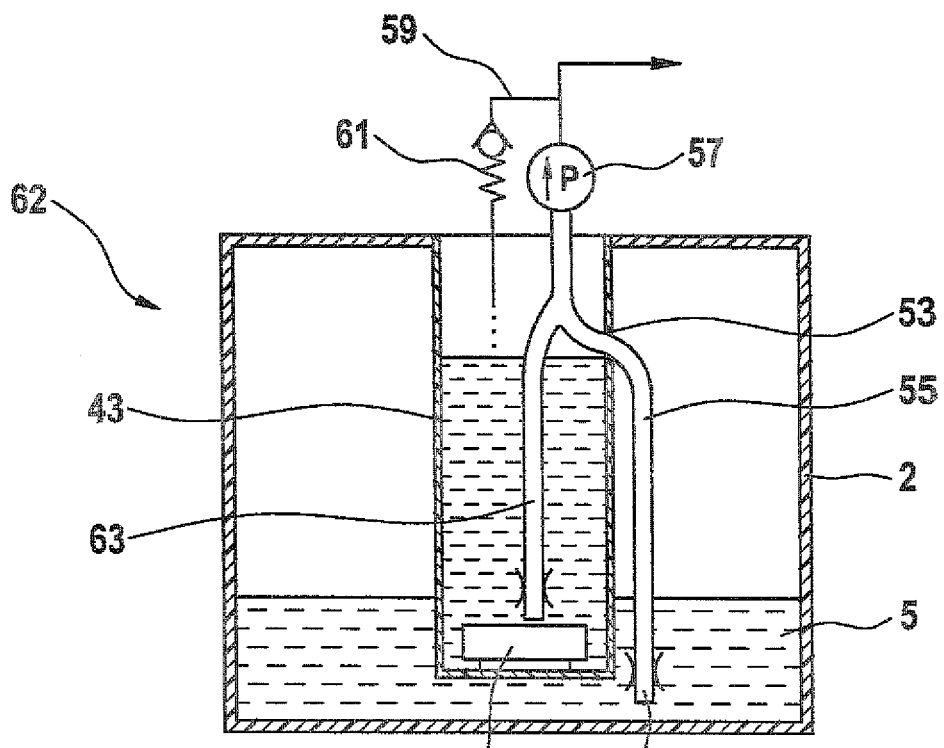
FIG. 6 shows a reducing agent tank with one line and one cup line.

FIG. 6 shows a tank arrangement 62 which additionally has a cup line 63 inside the cup 43. Directly upstream of the pumping module, above the overflow 53, this cup line communicates with the line 55 and can aspirate reducing agent from the cup and supply it to the downstream exhaust gas posttreatment arrangement. Thus when the line 55 that discharges into the tank is closed at its intake opening 67 by the frozen remainder of the tank, the thawed reducing agent is aspirated from the cup through the cup line 63 that is located in the cup and that has already thawed out. The tank 62 has an electric heater 65 disposed in the bottom region of the cup 43. The term "pumping module" is understood to mean the sum of the following components: pump 57, pressure regulating valve 61, selectively additionally including the return line 59, the line 55, and the cup line 63.

Figure 7:
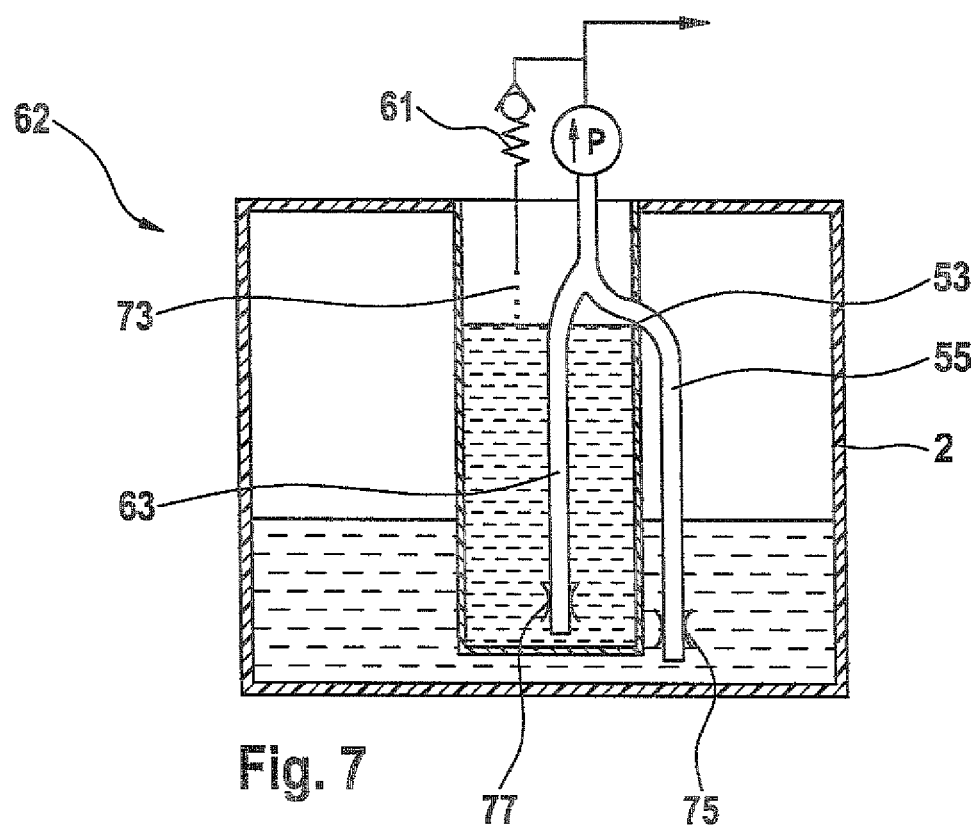
FIG. 7 shows a reducing agent tank with lines that are provided with throttle restrictions.

It is advantageous if the cup 43 is full at all times, so that shortly after the cup has thawed, a sufficient quantity of reducing agent that can be removed by suction is always available. The principle of the constantly full cup is satisfied if, in the thawed state (of the cup and remainder of the tank), aspiration is done simultaneously via the lines 55 and 63 from both the cup and the remainder of the tank. In the arrangement of FIG. 7, this is shown by way of suitable throttle restrictions in the lines 55 and 63: The line 55 has a first throttle restriction 75, and the cup line 63 has a second throttle restriction 77. It should be taken into account that the liquid removed by suction from the remainder of the tank is always more than the quantity to be injected into the exhaust gas system. Via the return of the pressure regulator 61, a permanently full cup 43 is thus assured. By way of the overflow 53 of the cup 43, excess reducing agent can optionally be returned (return quantity 73) to the outer region of the tank.

Figure 8:
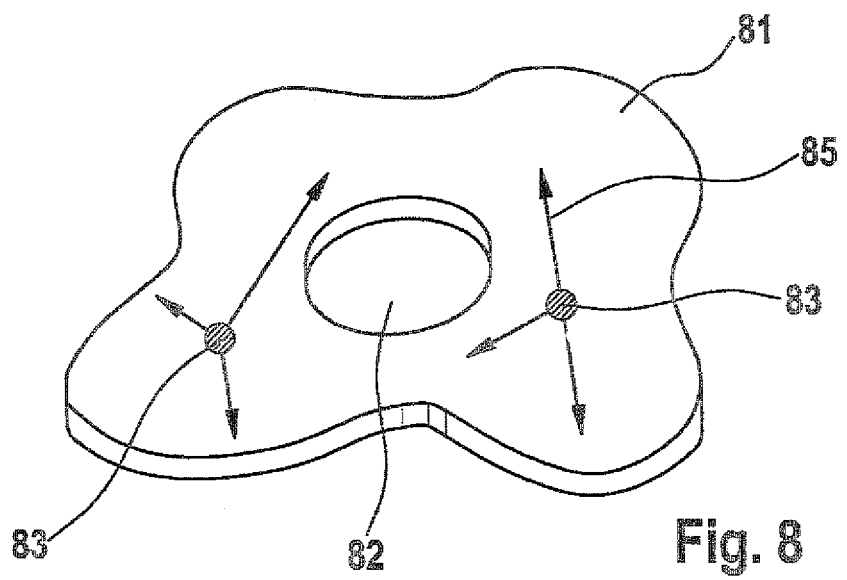
FIG. 8 shows a relatively flat aluminum body.

FIG. 8 shows an embodiment of a heater 65 in the form of a relatively flat aluminum body 81, in which one or more point-type heating elements 83, such as PTC heating elements (PTC=positive temperature coefficient) that are self-regulating at high temperatures, are integrated. The point-type heating elements dissipate the heat in the region of the cup to the relatively flat aluminum body; the direction of the heat flow is marked here with arrows 85. Because of its good thermal conductivity, aluminum is advantageous. The hole 82 in the middle of the aluminum body serves to secure the body to a mounting.

Figure 9:
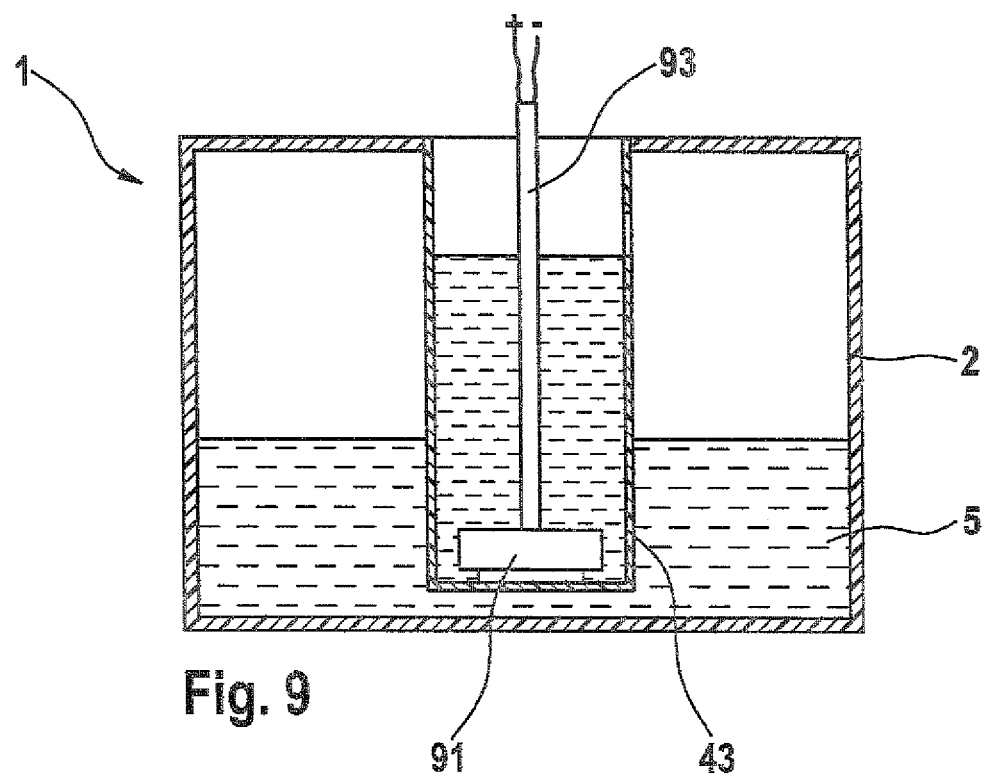
FIG. 9 shows a reducing agent tank with a cup and a heater.

FIG. 9 shows one possible disposition of a heater 91, in the form of the relatively flat aluminum body 81 that is insert-molded with plastic. By means of the barlike mounting 93 with which the power supply 93 is integrated, this relatively flat heating construction with integrated PTC heating elements is mounted near the bottom in the cup. The plastic insert molding serves to protect the PTC heating elements and the aluminum body from the aqueous urea solution.

Figure 10:
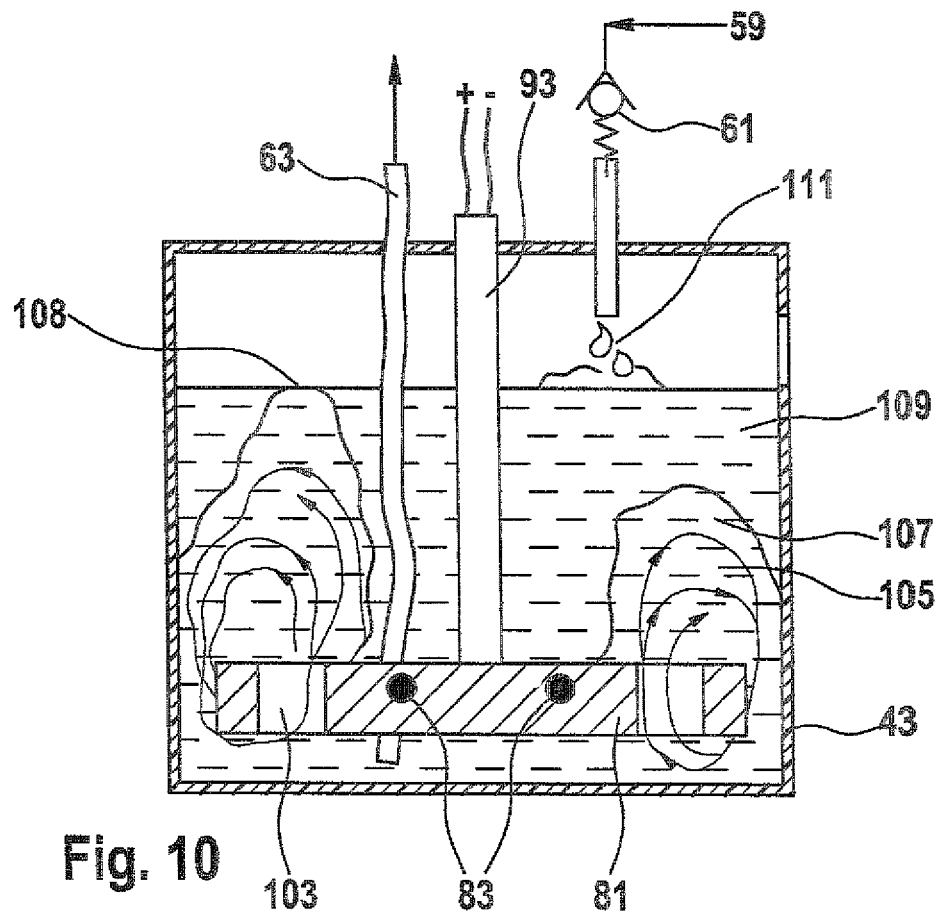
FIG. 10 shows a cup of a reducing agent tank.

FIG. 10 shows the disposition of a heater in a cup 43; here, the relatively flat aluminum body 81 insert-molded with plastic has peripheral convection bores 103, which connect reducing agent regions located near the bottom, below the aluminum body, to regions located above the aluminum body. This heater is based on convection, and a convection flow or flow circulation 105 occurs around the convection bores. Because of how the heater is disposed spatially, that thawing occurs first around the heating body. Via an upward-oriented convection flow, the heat in the already thawed medium is continuously transported upward. On being cooled there, it drops down again toward the heater. Hence a flow circulation from the heater upward arises, particularly in the region of the convection bores mounted in the aluminum. After a certain length of time, the thawing flow of heat reaches the surface of the ice. Thus the partial volume in the cup is partially thawed (thawed region 107 and (still-) frozen region 109). If a connection is now made between the aspiration point of the cup line 63 and the air above the thawed liquid (up to the surface of the ice, or to the melted region 108 toward the air cushion), the system can now enter into operation as soon as the aspirating cup line 63 has also thawed. The volume of ice still present in the partial volume, which is preferentially at the surface, is now additionally hawed out by the warm medium 111 flowing back via the pressure regulating valve. This warm medium drops onto the bits of ice remaining at the surface and thus reinforces the thawing process.

Figure 11:
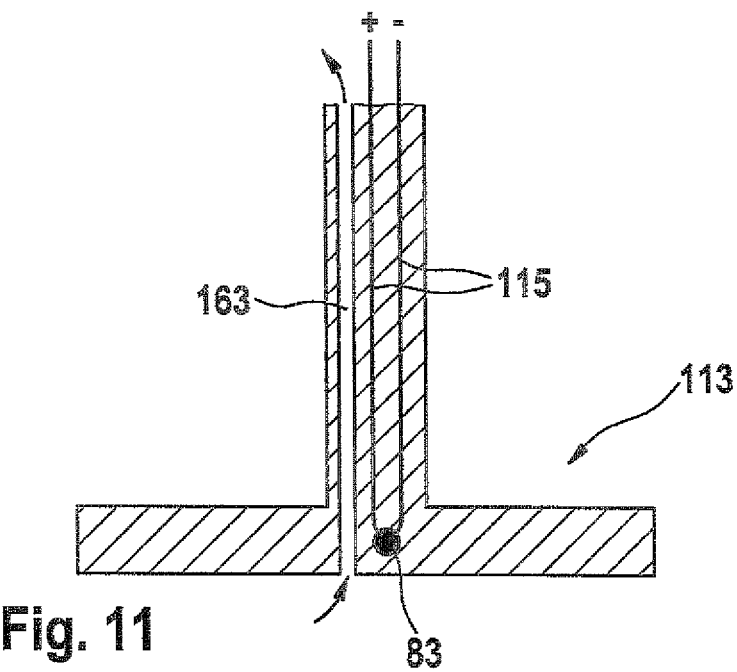
FIG. 11 shows a heater.

FIG. 11 shows an example of a heater 113 that can be used inside a cup, having a mounting element which for instance is joined integrally to the relatively flat aluminum body and with which a cup line 163 for removal by suction of the reducing agent from the cup is integrated. The electric supply lines 115, which supply one or more PTC heating elements 83 with electric current, extend parallel to the cup line 163. The mounting element with the integrated cup line 63 with an intake point near the bottom is injection-molded in plastic (not shown in further detail) in the same way as the relatively flat aluminum body. The cup line 63 extends via the cup into the pumping module. The electric supply line (supply lines 115) to the PTC is embodied as a resistor wire. It extends in the immediate vicinity of the cup line 163. Thus the cup line 163 can be thawed in good time by way of the heat generated in the resistor wire. Thus in an extremely short time, the quantity of liquid present in the cup is available to the system for its operation. Hence after an extremely short time, the operation of the system can be assured. With a thawed quantity present, it is thus possible for instance to drive a distance of approximately 500 to 1000 km. It is assumed that after that period of time, a further amount of aqueous urea solution in the overall tank will have thawed because of the surroundings and is then partially aspirated via the line 55.

Figure 12:
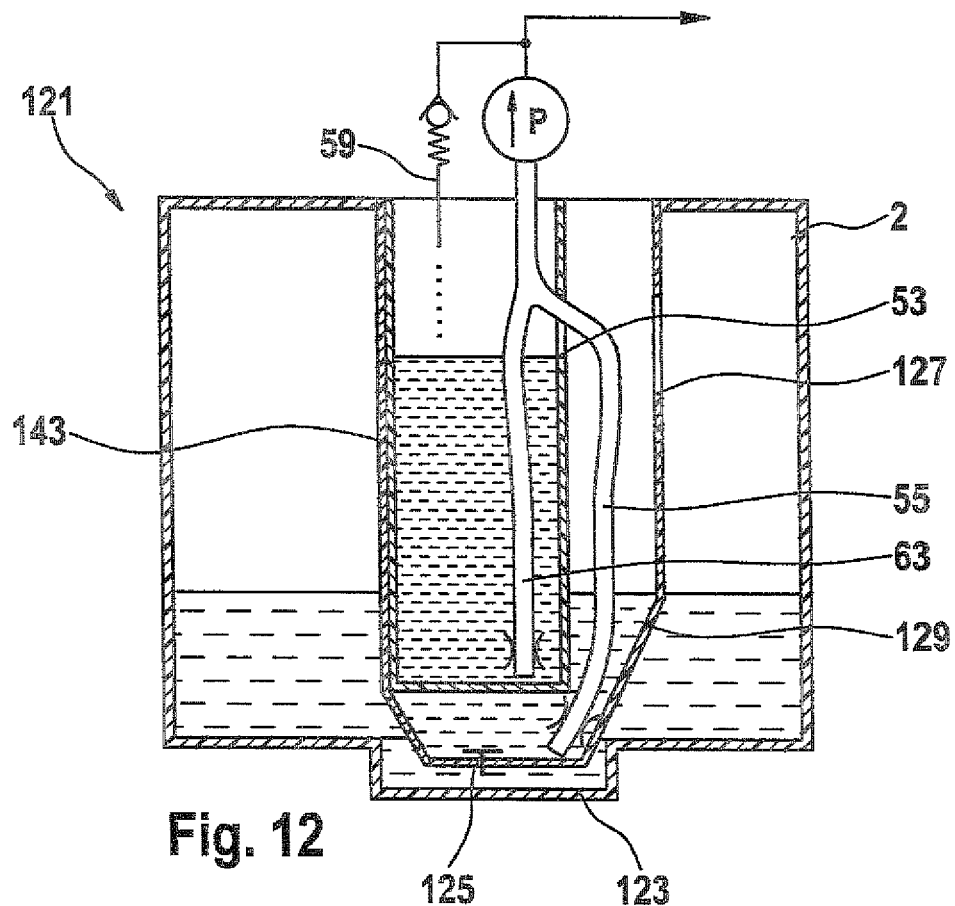
FIG. 12 shows a reducing agent tank with a cup and a tank.

FIG. 12 shows a further tank arrangement 121, in which a further tank 129 is disposed around the cup 143. This tank has a sump 123 in its bottom region, or in other words a well, with a shield valve 125 in the lowermost region. This tank 129 has an overflow 127 to the tank. Via the hydrostatic pressure, the liquid passes through the shield valve 125 to reach the tank. From there, the liquid is aspirated into the cup via the line 55. Hence the return quantity first fills the inner cup. By way of the cup overflow 53, the liquid then reaches the tank 129. Once that is full, the liquid flows back to the tank via the tank overflow 127. The cup overflow 53 is located above the tank overflow 127. Thus the tank overflow 127 causes the tank 129 to have a higher fill level than the remainder of the tank. Hence the line 55 that removes fluid by suction from the tank is always far below the surface of the liquid. This "cup in tank, tank in tank" construction makes the tank invulnerable to sloshing and ice impacts, the aspiration of air, and noise from sloshing and ice impacts. The "cup in tank" arrangement in the middle of the tank is furthermore advantageous in the event of sloshing motions and ice impacts. The liquid frozen in the tank forms a frozen ring, which is caught in the middle by the tank and thus has only a limited freedom of motion.

Figure 13:
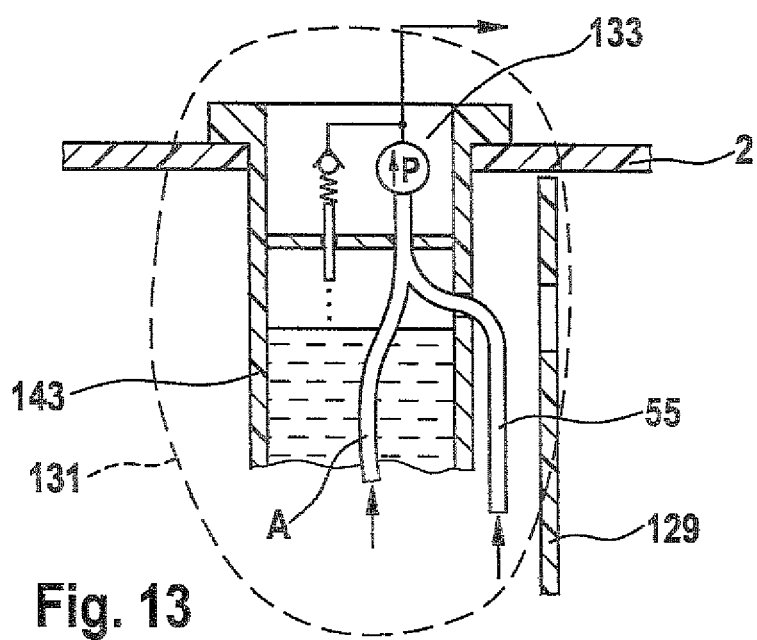
FIG. 13 shows a pumping module.

FIG. 13 shows an embodiment in which the pumping module 133 is placed on the cup 143 extending deeply into it. Thus without additional lines and connecting points, the pumping module and tank can communicate directly. The pumping module is furthermore positioned on the tank in a well, not shown in detail, of the tank wall. It is thus assured that along the surface of the tank, any slight leakage cannot reach the surroundings or not even reach the outside at all, since it is concealed or caught in the well. Hence the leakage does not get into the vehicle and can easily be removed from the well. The cup with the heater, the tank with the shield valve, and the pumping module form a function unit 131 that is virtually independent of the tank and that can be removed as a whole from the tank. This function unit can selectively be embodied as well with suitable sensors for the liquid level, temperature, or the quality of the reducing agent. The pumping module can be covered flush with the thank by a closure cap. The tank construction is embodied such that all the heat sources (tank heater, heater not shown in further detail of the pumping module, pump motor, etc.) are concentrated in the function unit and thus contribute jointly to thawing in a core region of the tank to assure that the warmup period is short.

Figure 14:
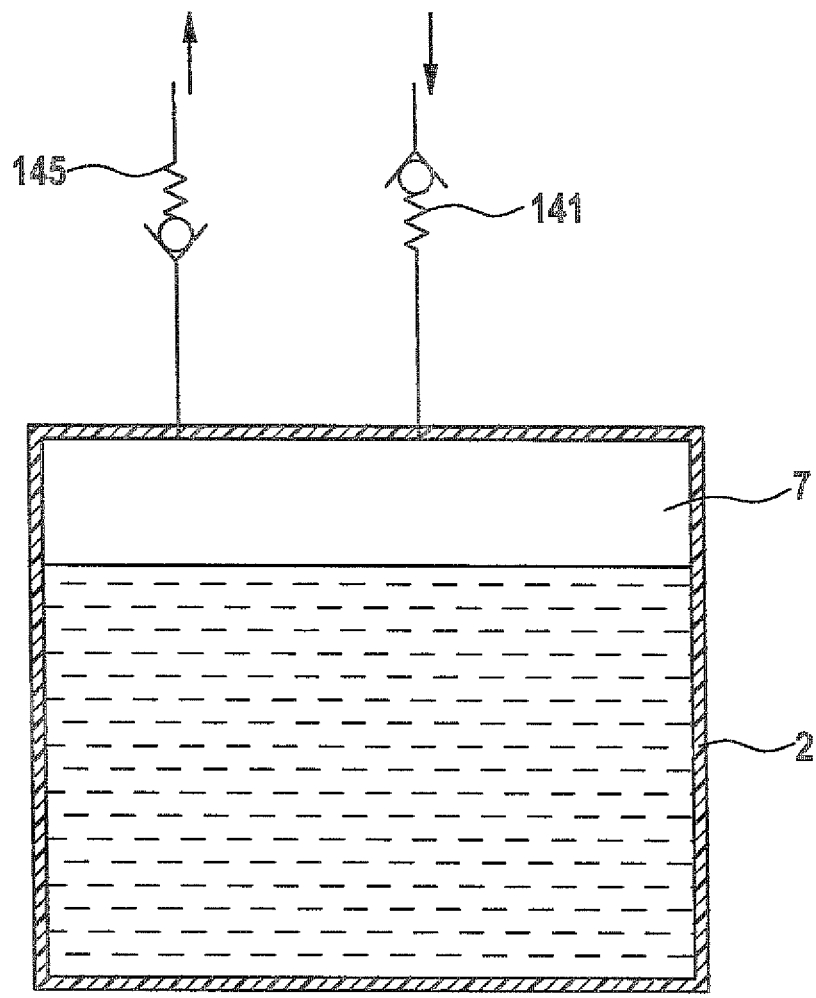
FIG. 14 is a schematic illustration of a tank with ventilation elements.

FIG. 14 schematically shows a tank with a tank wall 2 without showing the other components, such as the cup, pumping module, etc., in further detail. Because of fluid withdrawal, temperature fluctuations, and decomposition of the aqueous urea solution, the tank contents can build up different pressures in the tank in the region of the air cushion 6. By way of ventilation and venting valves 141 and 145, respectively, to the surroundings, these pressure fluctuations are taken into account. Since upon venting the risk is that ammonia will escape to the ambient atmosphere and cause odors, the venting operation is performed only at high internal tank pressures; that is, the tank is advantageously constructed in such a way that it can absorb moderate internal pressures without changing its shape impermissibly. Optionally, an activated charcoal filter may be provided, by way of which the gas containing ammonia can be carried upon venting.

The foregoing relates to the preferred exemplary embodiment of the invention, it being understood that other variants and embodiments thereof are possible within the spirit and scope of the invention, the latter being defined by the appended claims.

The invention claimed is:

1. A vehicle tank (1, 21, 41, 51, 62; 121) for a liquid reducing agent, for reducing nitrogen oxides in the exhaust gas of internal combustion engines, the vehicle tank comprising:
 a tank wall (2, 43, 129) made from plastic;
 a function unit (131) encompassed by the tank wall, the function unit including at least one pump (57), at least one pressure regulating valve (61), at least one inner tank (43, 143) with electrical heating (32, 65, 81, 83, 91, 93, 113), and at least one intake line (63) from the inner tank to the pump, the inner tank (43, 143) being disposed inside the vehicle tank such that the inner tank receives a partial volume of reducing agent and the inner tank subdivides the vehicle tank into a partial tank and a remainder of the tank, and the at least one intake line (63) is located in the partial tank; and
 a further intake line (55) located in the remainder of the tank, the at least one intake line (63) and the further intake line (55) leading to the at least one pump;
 wherein the pressure regulating valve (61) is disposed downstream of the at least one pump, the pressure regulating valve diverting excess reducing agent to the partial tank.

2. The vehicle tank according to claim 1, wherein the tank wall comprises a plurality of layers of material (11, 13, 15), at least one of which is embodied as a barrier layer (15).

3. The vehicle tank according to claim 2, wherein the reducing agent is an aqueous urea solution and at least indirectly contains ammonia, and the barrier layer (15) prevents the diffusion of ammonia through the tank wall.

4. The vehicle tank according to claim 1, wherein the electric heater has a plurality of self-regulating heating elements (83).

5. The vehicle tank according to claim 4, wherein the heating elements are disposed on an aluminum body (81).

6. The vehicle tank according to claim 5, wherein the aluminum body is embodied in platform shape, is disposed horizontally in the inner tank, and the aluminum body has at least one through bore (103) disposed longitudinally to its longitudinal axis.

7. The vehicle tank according to claim 1, wherein the further intake line (55) is dimensioned such that more reducing agent can be aspirated via the further intake line (55) than is needed at maximum for reducing the exhaust gas.

8. The vehicle tank according to claim 7, wherein the intake lines (55, 63) each contain at least one throttle restriction (75, 77), and a first throttle restriction (75) of the first intake line (55) has a greater flow cross section than a second throttle restriction (77) of the second intake line (63, 163).

9. The vehicle tank according to claim 1, further comprising an electrical line (115) disposed in the vicinity of the at least one intake line (63).

10. The vehicle tank according to claim 9, wherein the electrical line is embodied as a resistor wire in a mounting embodied as a heating bar.

11. The vehicle tank according to claim 1, wherein the vehicle tank is ventilated and vented (141, 145) to the outside.

12. The vehicle tank according to claim 11, wherein the ventilation is effected via an activated charcoal filter.

13. The vehicle tank according to claim 1, wherein the plastic tank is produced by using a blow molding process.

14. The vehicle tank according to claim 1, wherein the tank wall is provided with a thermal insulation (23), which at certain points effects a greater insulating action than at other points because the thermal insulation covers the tank wall.

15. The vehicle tank according to claim 1, wherein the inner tank is embodied in cup-shaped fashion (43) and of plastic.

16. The vehicle tank according to claim 1, wherein the inner tank is disposed essentially centrally in the vehicle tank, spaced apart from the tank wall.

17. The vehicle tank according to claim 1, wherein the inner tank has an overflow (53, 127) to the remainder of the tank.

18. The vehicle tank according to claim 1, wherein the at least one pump (57) and the pressure regulating valve (61) are combined into a pumping module that is secured to the inner tank and/or to the tank.

19. The vehicle tank according to claim 1, wherein the function unit can be removed as a whole from the vehicle tank and in caplike fashion closes an opening in the vehicle tank.

20. The vehicle tank according to claim 1, wherein the electric heater has a plurality of PTC heating elements.

21. The vehicle tank according to claim 1, wherein the tank wall is partially covered with a thermal insulation (23).

22. A vehicle tank (1, 21, 41, 51, 62; 121) for a liquid reducing agent, for reducing nitrogen oxides in the exhaust gas of internal combustion engines, the vehicle tank comprising:
   a tank wall (2, 43, 129) made from plastic;
   a function unit (131) encompassed by the tank wall, the function unit including at least one pump (57), at least one pressure regulating valve (61), at least one inner tank (43, 143) with electrical heating (32, 65, 81, 83, 91, 93, 113), and at least one intake line (63) from the inner tank to the pump,
   the inner tank (4, 143) being disposed inside the vehicle tank such that the inner tank receives a partial volume of reducing agent and the inner tank subdivides the vehicle tank into a partial tank and a remainder of the tank, and the at least one intake line (63) is located in the partial tank;
   a further intake line (55) located in the remainder of the tank, the at least one intake line (63) and the further intake line (55) leading to the at least one pump,
   the pressure regulating valve disposed downstream of the at least one pump, the pressure regulating valve diverting excess reducing agent to the partial tank; and
   a slosh tank (129) disposed surrounding the inner tank and at its lowest point has an opening to the vehicle tank.

23. The vehicle tank according to claim 22, wherein in the opening, there is a shield valve (125), which at a high liquid level in the vehicle tank is opened by the hydrostatic pressure of the reducing agent in the vehicle tank and which at a low liquid level in the vehicle tank closes the opening to the vehicle tank.

24. The vehicle tank according to claim 23, wherein the shield valve is disposed in the slosh tank in the region of the lowest point (sump 123).

25. A function unit for a vehicle tank (1; 21; 41; 51; 62; 121) for a liquid reducing agent, in particular for a urea solution, for reducing nitrogen oxides in the exhaust gas of internal combustion engines, comprising:
   at least one pump (57);
   at least one pressure regulating valve (61);
   at least one inner tank (43, 129) with integrated electric heating;
   at least one intake line (55; 63; 163) from the inner tank to the pump; and
   a further intake line (55) and the at least one intake line (63) leading to the at least one pump;
   the pressure regulating valve being disposed downstream of the at least one pump, the pressure regulating valve diverting excess reducing agent.

* * * * *

UNITED STATES PATENT AND TRADEMARK OFFICE
CERTIFICATE OF CORRECTION

PATENT NO. : 8,586,895 B2  Page 1 of 1
APPLICATION NO. : 12/066586
DATED : November 19, 2013
INVENTOR(S) : Haeberer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1653 days.

Signed and Sealed this
Twenty-second Day of September, 2015

Michelle K. Lee
*Director of the United States Patent and Trademark Office*